US011581962B2

(12) United States Patent
Sen et al.

(10) Patent No.: US 11,581,962 B2
(45) Date of Patent: *Feb. 14, 2023

(54) INTRUSION DETECTION AND RADIO FINGERPRINT TRACKING

(71) Applicant: Department 13, LLC, Columbia, MD (US)

(72) Inventors: Robi Sen, McLean, VA (US); Steve Shattil, Cheyenne, WY (US)

(73) Assignee: Department 13, Inc., Columbia, MD (US)

(*) Notice: Subject to any disclaimer, the term of this patent is extended or adjusted under 35 U.S.C. 154(b) by 291 days.

This patent is subject to a terminal disclaimer.

(21) Appl. No.: 17/069,412

(22) Filed: Oct. 13, 2020

(65) Prior Publication Data

US 2021/0091865 A1 Mar. 25, 2021

Related U.S. Application Data

(63) Continuation of application No. 15/613,725, filed on Jun. 5, 2017, now Pat. No. 10,805,018, which is a (Continued)

(51) Int. Cl.
*H04B 17/309* (2015.01)
*H04W 12/02* (2009.01)
(Continued)

(52) U.S. Cl.
CPC ............. *H04B 17/309* (2015.01); *H04K 1/00* (2013.01); *H04K 3/825* (2013.01);
(Continued)

(58) Field of Classification Search
CPC ..... H04W 12/12; H04W 12/02; H04W 12/79; H04L 63/1433; H04L 63/1416;
(Continued)

(56) References Cited

U.S. PATENT DOCUMENTS 5,420,910 A 5/1995 Rudokas et al.
5,604,806 A 2/1997 Hassan et al.
(Continued)

OTHER PUBLICATIONS

J. Lv, Z. Li, L. Kang, R. Zeng and X. Huang, "Frequency Converters Nonlinear Modeling Using X Parameter," 2019 International Conference on Microwave and Millimeter Wave Technology (ICMMT), 2019, pp. 1-3, doi: 10.1109/ICMMT45702.2019.8992119. (Year: 2019).*

(Continued)

*Primary Examiner* — Chau Le
(74) *Attorney, Agent, or Firm* — Schmeiser Olsen & Watts, LLP

(57) ABSTRACT

A radio transmitter adjusts its radio frequency (RF) fingerprint to defeat RF fingerprinting identification without destroying the content of its transmissions. The radio transmitter comprises a frequency-upconverter configured to upconvert a baseband or intermediate-frequency signal to an RF signal, and an amplifier to amplify the RF signal to produce a transmission signal. An RF fingerprint control circuit changes the non-linear behavior of the frequency-upconverter or the amplifier in order to change the RF fingerprint. The transmitter may create RF fingerprint "personalities" to be paired with different radio protocol behaviors and subscriber terminal identification codes (e.g., MAC addresses or SMSIs) for generating different radio identities.

17 Claims, 10 Drawing Sheets

Related U.S. Application Data continuation of application No. 14/109,928, filed on Dec. 17, 2013, now Pat. No. 9,673,920.

(60) Provisional application No. 61/738,924, filed on Dec. 18, 2012.

(51) Int. Cl.

| | |
|---|---|
| *H04W 12/12* | (2021.01) |
| *H04K 1/00* | (2006.01) |
| *H04K 3/00* | (2006.01) |
| *H04L 9/40* | (2022.01) |
| *H04K 1/04* | (2006.01) |

(52) U.S. Cl.
CPC ...... *H04L 63/1416* (2013.01); *H04L 63/1433* (2013.01); *H04W 12/02* (2013.01); *H04W 12/12* (2013.01); *H04K 1/04* (2013.01)

(58) Field of Classification Search
CPC ............ H04K 3/825; H04K 1/04; H04K 1/00; H04B 17/309
See application file for complete search history.

(56) References Cited

U.S. PATENT DOCUMENTS

| | | | |
|---|---|---|---|
| 5,826,186 | A | 10/1998 | Mitchell et al. |
| 5,995,533 | A | 11/1999 | Hassan et al. |
| 6,023,619 | A | 2/2000 | Kaminsky |
| 6,203,541 | B1 | 3/2001 | Keppel |
| 6,229,445 | B1 | 5/2001 | Wack |
| 6,269,246 | B1 | 7/2001 | Rao et al. |
| 6,778,025 | B1 | 8/2004 | Leuthold |
| 6,844,816 | B1 | 1/2005 | Melton et al. |
| 7,002,509 | B2 | 2/2006 | Karlsson |
| 7,230,971 | B1 | 6/2007 | Beard |
| 7,630,736 | B2 | 12/2009 | Wang |
| 7,677,438 | B2 | 3/2010 | DeJean |
| 8,018,883 | B2 | 9/2011 | Bowser et al. |
| 8,046,835 | B2 | 10/2011 | Herz |
| 8,810,404 | B2 * | 8/2014 | Bertoncini ............... H04K 1/00 375/240.19 |
| 8,850,043 | B2 | 9/2014 | Rodriguez et al. |
| 9,121,802 | B2 | 9/2015 | Kormanyos |
| 9,438,614 | B2 | 9/2016 | Herz |
| 9,443,085 | B2 | 9/2016 | Glew et al. |
| 9,503,470 | B2 | 11/2016 | Gertner et al. |
| 10,555,290 | B2 | 2/2020 | Dinan |
| 2003/0095322 | A1 | 5/2003 | Gehlot |
| 2003/0110392 | A1 | 6/2003 | Aucsmith et al. |
| 2003/0139165 | A1 | 7/2003 | Smith et al. |
| 2003/0234718 | A1 | 12/2003 | Fujisawa et al. |
| 2004/0083129 | A1 | 4/2004 | Herz |
| 2006/0053490 | A1 | 3/2006 | Herz |
| 2006/0181394 | A1 | 8/2006 | Clarke |
| 2007/0169194 | A1 | 7/2007 | Church et al. |
| 2008/0079540 | A1 | 4/2008 | Aull et al. |
| 2008/0084294 | A1 | 4/2008 | Zhiying et al. |
| 2008/0261509 | A1 | 10/2008 | Sen |
| 2009/0049546 | A1 | 2/2009 | Verma |
| 2009/0201133 | A1 | 8/2009 | Bruns |
| 2009/0305665 | A1 | 12/2009 | Kennedy et al. |
| 2010/0118921 | A1 | 5/2010 | Abdelmonem et al. |
| 2010/0131751 | A1 | 5/2010 | Reznik et al. |
| 2011/0058485 | A1 | 3/2011 | Sloan |
| 2011/0115680 | A1 | 5/2011 | Phan Huy et al. |
| 2011/0252121 | A1 | 10/2011 | Borgs et al. |
| 2012/0320787 | A1 | 9/2012 | Sugar et al. |
| 2013/0007333 | A1 * | 1/2013 | Fai ..................... G06F 13/4086 710/313 |
| 2013/0019317 | A1 | 1/2013 | Whelan et al. |
| 2013/0305377 | A1 | 11/2013 | Herz |
| 2014/0040509 | A1 | 2/2014 | Stedman |
| 2014/0100821 | A1 | 4/2014 | Leonard |
| 2014/0146969 | A1 | 5/2014 | Sadot et al. |
| 2014/0159653 | A1 * | 6/2014 | Von Novak ......... H04B 5/0037 320/108 |
| 2014/0237599 | A1 | 8/2014 | Gertner et al. |
| 2016/0156593 | A1 | 6/2016 | Yan |
| 2016/0381079 | A1 | 12/2016 | Ben-Shalom et al. |

OTHER PUBLICATIONS

K. J. Ellis and N. Serinken, Radio Science, vol. 36, No. 4, pp. 585-597, Jul.-Aug. 2001.

S. C. G. Periaswamy, D. R. Thompson, J. Di, "Fingerprinting RFID Tags", IEEE Transactions on Dependable and Secure Computing, Oct. 21, 2010, IEEE computer Society Digital Library.

N. Saparkhojayev and D. R. Thompson, "Matching Electronic Fingerprints of RFID Tags using the Hotelling's Algorithm," IEEE Sensors Applications Symposium, New Orleans, La., Feb. 17-19, 2009.

D. Zanetti, B. Danev, and S. Capkun, "Physical-layer identification of UHF RFID Tags", Proceedings of the Sixteenth Annual International Conference on Mobile Computing and Networking, MobiCom '10 on Sep. 20-24, 2010 in Chicago, Ill., ACM, pp. 353-364.

D. Zanetti, P. Sachs and S. Capkun, "On The Practicality of UHF RFID Fingerprinting: How Real is the RFID Tracking Problem?" Privacy Enhancing Technologies vol. 6794 of the series Lecture Notes in Computer Science pp. 97-116, 2011.

I.R. Adeyemi, N.B. Ithnin, "Users Authentication and Privacy control of RFID Card," International Journal of Scientific & Engineering Research, vol. 3, Issue 10, Oct. 2012 ISSN 2229-5518.

L. Xiao, L.J. Greenstein, N.B. Mandayam, "Using the Physical Layer for Wireless Authentication in Time-Variant Channels," IEEE Transactions on Wireless Communications, vol. 7, No. 7, Jul. 2008.

L. Xiao, N.B. Mandayam, W. Trappe, "Channel-Based Detection of Sybil Attacks in Wireless Networks," IEEE Transactions on Information Forensics and Security, vol. 4, No. 3, Sep. 2009.

W.Wang, D. Pu, A. Wyglinski, "Detecting Sybil Nodes in Wireless Networks with Physical Layer Network Coding", 2010 IEEE/IFIP International Conference on Dependable Systems & Networks (DSN).

Nguyen, Giao T., et al. "A trace-based approach for modeling wireless channel behavior." Proc. 28th Conference on Winter Simulation. IEEE Computer Society, 1996.

Ureten, Oktay, and Nur Serinken. "Wireless security through RF fingerprinting." Canadian Journal of Electrical and Computer Engineering 32.1 (2007): 27-33.

Suski II. William C., et al. "Using spectral fingerprints to improve wireless network security." IEEE Globecom 2008, Nov. 30-Dec. 4, 2008.

Ureten, O., and Nur Serinken. "Bayesian detection of Wi-Fi transmitter RF fingerprints." Electronics Letters 41.6 (2005): 373-374.

Han, et al. "Distributed Cooperative Transmission with Unreliable and Untrustworthy Relay Channels", pp. 1-13, Hindawi Pub. corp., Eurasip Journal on Wireless Comm. and Networking, vol. 2009, Article ID 740912.

Rehak, et al., "Adaptive Multiagent System for Network Traffic Monitoring", pp. 16-25, 2009 IEEE Intelligent Systems.

Ghit, et al., "Intrusion Detection in Multi-Agent Systems", INCoS 2009, SCI 329, pp. 235-255 Springer-Verlag Berlin Heidelberg 2010.

Ou, "Host-Based Intrusion detection systems adapted from agent-based artificial immune systems", Neurocomputing 88 (Jan. 2012) pp. 78-86.

Dasgupta, "Immunity-Based Intrusion Detection System: A General Framework", pp. 1-14, Jan. 2012. http://lssrl.cs.memphis.edu/files/papers/Immune-IDS.pdf.

Jokar, "Model based intrusion for home area networks in small grids", 9 pages https://pdfs.semanticscholar.org.

Polak, et al., "RF Fingerprinting of Users Who Actively Mask Their Identities with Artificial Distortion", IEEE 978-1-4673-0323-1/11; 2011 Conference Record of the Forty Fifth Asilomar Conference on Signals, Systems and Computers (ASILOMAR), Nov. 6-9, 2011.

(56) References Cited

OTHER PUBLICATIONS

Brik, et al.; "Wireless Device Identification with Radio metrix Signature", Mobicom '08, ACM 978-1-60558-096-8/08/09.

* cited by examiner

INTRUSION DETECTION AND RADIO FINGERPRINT TRACKING

CROSS-REFERENCE TO PRIOR APPLICATIONS

This application is a Continuation of U.S. patent application Ser. No. 15/613,725, filed on Jun. 5, 2017, now U.S. Pat. No. 10,805,018, which is a Continuation of U.S. patent application Ser. No. 14/109,928, filed Dec. 17, 2013, now U.S. Pat. No. 9,673,920, which claims priority to Provisional Appl. No. 61/738,924, filed Dec. 18, 2012, all of which are hereby incorporated by reference in their entireties and all of which this application claims priority under at least 35 U.S.C. 120 and/or any other applicable provision in Title 35 of the United States Code.

BACKGROUND

1. Field of the Invention

Subject matter disclosed herein relate generally to radio fingerprinting of transmitted signals, and more particularly, to countermeasures to radio fingerprinting employed within radio transmitters.

2. Introduction

Radio Fingerprinting is a technique that uniquely identifies a transceiver based on features of the signal it generates. Physical-layer fingerprinting techniques comprise two groups: transient signal analysis and steady state signal analysis. A transient signal is transmitted upon transmitter stage power up and power down. The transient signal occurs in the short period (typically micro seconds) during which capacitive loads charge or discharge, the power amplifier ramps its power output, and, in some cases, when the frequency synthesizer transitions between steady state frequency generation and power-off. The steady-state period of a signal transmission is defined here as the period between the start and end transients.

In the electronic warfare arena, specific emitter identification techniques have been developed at the Naval Research Laboratory to catalog radar transmitters, and to later intercept a radar signal and uniquely identify the radar transmitter that is the source of that signal.

K. J. Ellis and N. Serinken, Radio Science, Vol. 36, No. 4, pp. 585-597, July-August 2001 discusses extracting features from the transient start-up phase of a VHF radio transmission and using those characteristics to unambiguously identify a transmitter.

S. C. G. Periaswamy, D. R. Thompson, J. Di, "Fingerprinting RFID Tags", IEEE Transactions on Dependable and Secure Computing, 21 Oct. 2010, IEEE computer Society Digital Library, <http://doi.ieeecomputersociety.org/10.1109/TDSC.2010.56> discusses using a tag's minimum power responses at multiple frequencies as a unique fingerprint.

N. Saparkhojayev and D. R. Thompson, in "Matching Electronic Fingerprints of RFID Tags using the Hotelling's Algorithm," IEEE Sensors Applications Symposium, New Orleans, La., Feb. 17-19, 2009, proposes creating an electronic fingerprint of a tag with different features, such as amplitude, frequency, phase, and timing, and using the Hotelling's T2 algorithm to compare a tag's fingerprint with a fingerprint database.

D. Zanetti, B. Danev, and S. Capkun, in "Physical-layer identification of UHF RFID Tags", Proceedings of the Sixteenth Annual International Conference on Mobile Computing and Networking, MobiCom '10 on Sep. 20-24, 2010 in Chicago, Ill., ACM, pp. 353-364, employs measured time-domain and spectral-domain features of passive UHF RFID tag preambles for classifying and identifying RFID tags.

U.S. Patent Publication No. 2006/0181394 describes comparing an RFID tag fingerprint to an expected RF fingerprint, wherein the fingerprints are measurements of signal amplitude, phase, and frequency. Other U.S. patents and patent applications in this area include U.S. Patent Application Publication No. 20030234718, U.S. Pat. Nos. 5,420,910, 6,229,445, U.S. Patent Application Publication No. 20080079540, U.S. Pat. No. 5,420,910, and U.S. Patent Application Publication No. 20090201133.

An RF fingerprinting process comprises the steps shown in FIG. 1. An analog signal is converted to a digital signal 101. Once in a digital form, the transient portion of the signal is extracted 102. Upon isolating the transient, the amplitude, frequency and phase components of the transient are extracted 103. These components are used for the extraction of specific features that define a transceiver-print 104. A statistical classifier is used to determine if a given transceiver-print is normal or anomalous 105. Finally, a decision filter is applied to the classification results of a set of transceiver-prints in order to render a final decision regarding the status (e.g. authorized or intruder) of a device 106.

Transient analysis, rather than steady-state signal analysis, is the most common type of radio fingerprinting. However, digital transmitters intentionally introduce repetitive sequences, such as preambles, to simplify receiver design and enhance multiple access in the radio channel. This makes steady-state signal analysis feasible.

Steady state signals offer a relatively attractive alternative to transient analysis. If discrimination is performed in the frequency domain, the use of standard low-cost ADC sample rates and receiver architectures are possible.

Similar to a transient signal's fingerprint, the unique electromagnetic fingerprint of a steady-state signal arises from component design (e.g., filters, power amplifiers, inductors, capacitors, etc.), same-component manufacturing tolerance spread, PCB materials and PCB soldering etc. Since signal detection cannot identify which variances in transmitter components account for which features in a measured signal, adaptations to the RF transmit chain and/or the baseband synthesis of the transmitted signals may be performed to defeat radio fingerprinting, generate multiple radio identities, and/or spoof radio fingerprints. These and other needs in the field are addressed by aspects of the present invention.

SUMMARY

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

As the unique characteristics of transceivers are manifested in the transient portion of a signal, a key objective of radio fingerprinting is to isolate and extract the transient. The challenge, however, is identifying the starting point of the transient.

Accordingly, one aspect of the invention provides for obfuscating at least one of the starting point and the end point of the transient in order to defeat transient extraction for radio fingerprinting.

Since the beginning of the signal transient is typically identified using threshold-detection or Bayesian step change detection, a transmitter may generate a bias signal to defeat threshold detection. Some aspects of the invention provide for selecting the bias signal.

In some cases, the signal transient may be detected by its phase characteristics (e.g., the slope of the phase associated with a transient is typically linear). A key requirement for successful detection of the transient's starting point is to identify where the phase variance becomes constant. Therefore, a transmitter may be configured to generate a variable or non-linear signal phase upon startup in order to hinder transient detection. For example, the carrier signal may be varied in frequency during at least a portion of the transient duration. In some aspects, continuous phase modulation may be employed. Alternative approaches may provide for generating a non-constant phase variance in the transient.

Another aspect of the invention provides for adapting one or more signal parameters in the transient that are measured for radio fingerprinting.

Transient analysis may measure the minor amplitude variations that occur upon transmitter switch on. Transient analysis may comprise measuring the variance of the transient's spectral components. Various combinations of signal frequency, phase, and amplitude may be used to define features for radio fingerprinting. In some cases, a fingerprint may comprise a vector of average feature values and a covariance matrix of the measured parameters.

Therefore, an aspect of the invention comprises a transmitter configured to generate a signal that changes the transmission characteristics enough to defeat identification without destroying the content of the transmissions. Implementations of such aspects may include variable or adaptive pulse-shaping filters.

Another aspect of the invention comprises a transmitter configured to select a fingerprint from a predetermined plurality of transmission characteristics, or radio fingerprints, before transmitting a signal. In such aspects, the transmitter may select a radio identity by pairing one of a set of selectable subscriber terminal identification codes (e.g., MAC addresses or IMSIs) with one of a set of selectable radio fingerprints.

Since a fingerprint of a steady-state signal typically comprises features derived from spectral analysis, such as a discrete Fourier transform (DFT) of at least one portion of the signal, a transmitter is configured to employ a DFT for imparting a predetermined spectral fingerprint to its transmitted steady-state signals. Specifically, the DFT may comprise a weighting matrix for scaling the Fourier transform's bins with at least one predetermined set of complex weights.

In accordance with one aspect of the invention, the weighting matrix is periodically or continuously updated to impart different spectral fingerprints to the transmitted steady-state signal, thus defeating radio fingerprinting. In another aspect, the weighting matrix comprises a predetermined set of spectral fingerprints, and an identity module is configured for pairing each spectral fingerprint with one of a plurality of predetermined subscriber terminal identification codes (e.g., MAC addresses or SMSIs). This permits the transmitter to employ a plurality of radio identities.

In another aspect of the invention, a transmitter is configured for employing the identity of at least one other transmitter for spoofing transmissions. The transmitter performs a DFT on at least one portion of another transmitter's steady-state signal. After correcting for channel distortions, the other transmitter's spectral fingerprint is determined, and a weighting matrix for a DFT is adapted to reproduce the other transmitter's spectral fingerprint. The transmitter may employ the other transmitter's subscriber terminal identification code.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific aspects thereof, which are illustrated in the appended drawings. These drawings depict only typical aspects of the invention and are not therefore to be considered to be limiting of its scope. Aspects of the invention will be described and explained with additional specificity and detail through the use of the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

The present disclosure is directed to techniques for defeating mechanisms designed to identify a radio transmitter based on unintended identifying characteristics of its transmitted signals. As will be described in greater detail below, a transmitter circuit provides for masking and/or altering the transient and/or the spectral characteristics of its transmissions.

Figure 1:
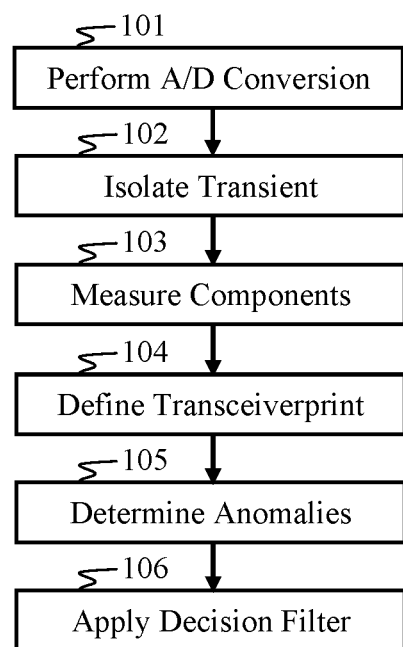
FIG. 1 is a flow diagram depicting a prior-art RF fingerprinting process.
Figure 2:
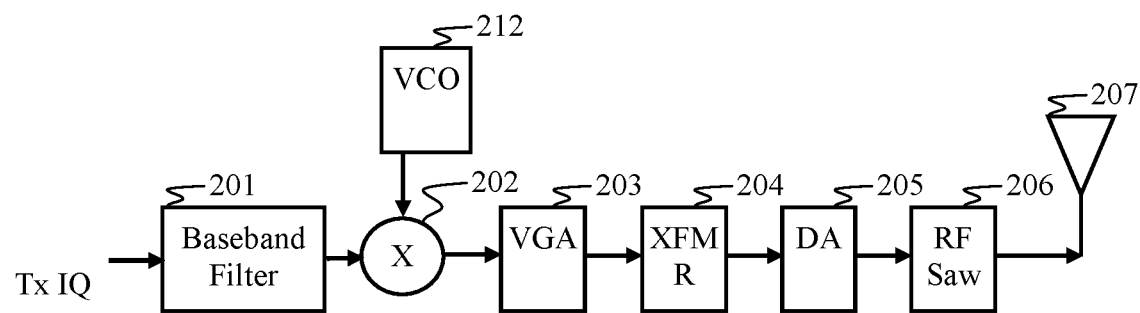
FIG. 2 is a block diagram of a transmitter configured in accordance with aspects of the invention.

In FIG. 2, a transmitter comprises a baseband filter 201, a frequency up-converter (which comprises a voltage controlled oscillator (VCO) 212 and a mixer 202), an RF variable gain amplifier (VGA) 203, a transformer (XMFR) 204, a driver amplifier (DA) 205, and a transmit filter, such as an RF SAW filter 206, which may optionally be coupled to one or more antennas, such as antenna 207. In aspects of the invention, any of the transmitter's system components, such as components 201, 202, 212, 203, 204, 205, 206, and 207, may be configured for selecting and imparting different radio signatures, or fingerprints, to the signal transmitted by the antenna 207.

A baseband transmit signal (Tx IQ) having in-phase (I) and quadrature-phase (Q) components is filtered by the baseband filter 201. In some aspects of the invention, the baseband filter 201 is configurable for providing different spectral and/or temporal characteristics to the filtered baseband signal at its output. Such variable characteristics may be used to obfuscate or spoof radio identities derived from the transmitted signal. In addition to a pulse-shaping function, the baseband filter 201 may comprise a fingerprinting function to produce selectable or variable spectral and/or temporal characteristics in the baseband signal that are subsequently used to identify the transmitter of a transmitted signal. In some aspects of the invention, the baseband filter 201 may correct for or obfuscate spectral and/or temporal signatures resulting from any of the other transmitter components 202-207 and 212.

The VCO 212 and mixer 202 constitute a frequency up-converter. Since both the VCO 212 and the mixer 202 can impart identifying characteristics to the transmit signal, one or both of these components may be configurable for imparting selectable identifying characteristics to the transmitted signal. For example, mixers (such as the mixer 202) typically rely on the non-linear relationship between voltage and current to multiply a pair of input signals. Mixers typically comprise diodes, transistors biased near cut off, analog multipliers, and/or non-linear optics. Thus, variations within the manufacturing tolerances of these components can produce distinguishing features in the non-linear behavior, enabling the transmitted signal to be analyzed for identifying the transmitter.

The amplifiers 203 and/or 205 may cause identifying signal characteristics to be imparted in the transmitted signal. For example, an amplifier's non-linearity, rise time, overshoot, settling time, and/or ringing may translate into transmitted signal characteristics that can be used to identify the transmitter. Thus, some aspects of the invention alter one or more of these identifying signal characteristics. In some aspects, the amplifiers 203 and/or 205 are configured for changing these signal characteristics. In other aspects, other transmitter components, such as filters, may be adapted or added to remove, obfuscate or spoof identifying transmitted signal characteristics.

Figure 3:
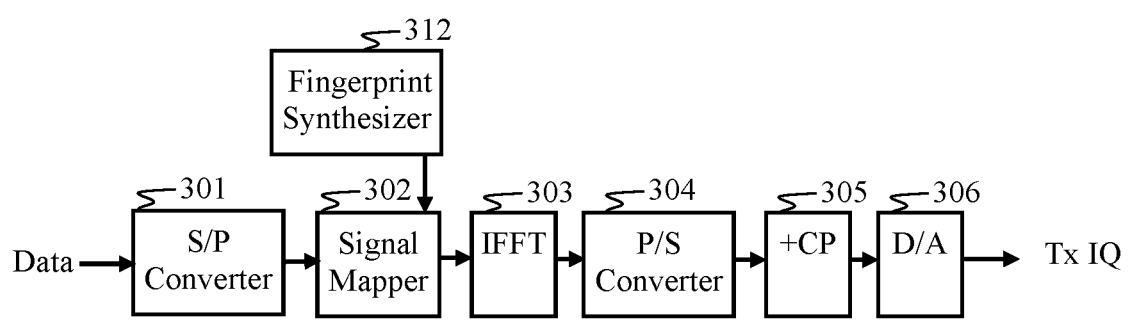
FIG. 3 is a block diagram of a baseband signal generator configured in accordance with an aspect of the invention.

FIG. 3 is a block diagram of a baseband signal generator configured for generating the Tx IQ signal (such as shown as an input to the baseband filter 201) in accordance with an aspect of the invention. In this aspect, the Tx IQ signal is an OFDM signal. The baseband signal generator comprises a serial-to-parallel (S/P) converter 301, a signal mapper 302, an inverse fast Fourier transform (IFFT) 303, a parallel-to-serial (P/S) converter 304, a cyclic prefix appender 305, a digital-to-analog converter 306, and a fingerprint synthesizer 312 coupled to the signal mapper 302.

The S/P converter 301 converts an input digital data sequence into a parallel data format. Typically, the input data sequence comprises information bits and error-correction bits (such as parity check bits). The signal mapper 302 (typically a modulator) maps data symbols to a constellation of modulation values. For example, phase-shift key (PSK) values or quadrature amplitude modulation (QAM) values are commonly used. The signal mapper 302 may optionally employ a spreading matrix for spreading the input symbols prior to mapping to the constellation. Since the signal mapper 302 conveys data symbols to frequency bins of the IFFT 303, in some aspects of the invention, the signal mapper 302 comprises a filter for shaping the spectrum of the IFFT's 303 output.

The fingerprint synthesizer 312 may adapt the signal mapper 302 to impart a predetermined spectral profile to the IFFT's 303 output, such as to synthesize a radio fingerprint in the transmitted signal. For example, the fingerprint synthesizer 312 may select filter weights in the signal mapper's 302 filter (not shown).

In another aspect of the invention, the fingerprint synthesizer 312 controls the signal mapper's 302 constellation, such as to impart a variable or non-linear phase in the constellation values in order to hinder transient detection. For example, detection of the transient's starting point may comprise identifying where the phase variance becomes constant. Therefore, a transmitter configured to generate a non-linear and variable signal phase upon startup can hinder transient detection.

It is well known that an OFDM-type of signal generator can synthesize single-carrier signals. Similarly, an OFDM synthesis may be used to synthesize pulse shapes on each subcarrier of an OFDM signal. Specifically, instead of each IFFT 303 frequency bin corresponding to just one OFDM subcarrier, multiple IFFT 303 bins may be used to construct each modulated OFDM subcarrier. Thus, the IFFT 303 may provide finer frequency resolution than required for OFDM. The IFFT may be used to provide at least one of frequency-domain characteristics and time-domain transient characteristics to the transmitted signal.

In digital wireless communication systems (GSM, CDMA etc.), PLLs are used to provide the local oscillator up-conversion during transmission. A PLL is a control system that generates an output signal Sour whose phase is typically fixed to the phase of an input reference signal Sref. In most cellular handsets, this function has been largely integrated into a single integrated circuit to reduce the cost and size of the handset.

Figure 4:
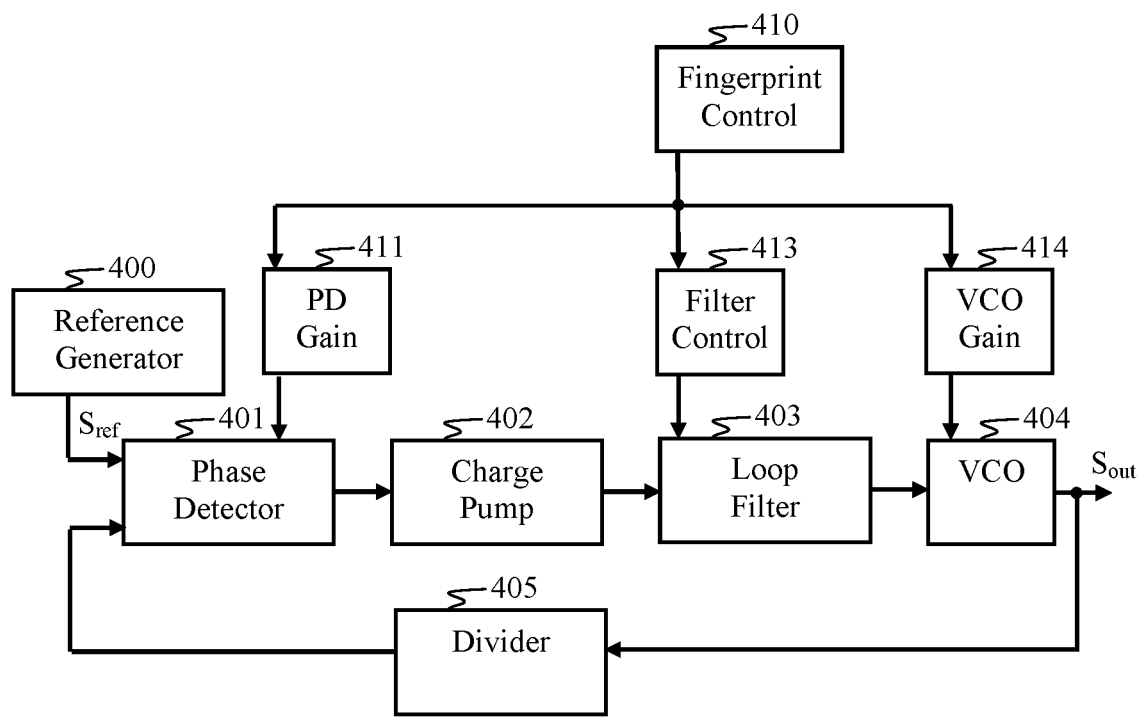
FIG. 4 is a block diagram of a Phase-Locked Loop configured in accordance with an aspect of the invention.

FIG. 4 is a block diagram of a PLL configured in accordance with an aspect of the invention. The PLL comprises a variable-frequency oscillator, VCO 404, and a phase detector 401. The phase detector 401 compares the phase of the reference signal Sref (synthesized by a reference signal generator 400) with the phase of the output signal Sour generated by the VCO 404 and produces an error signal. The error signal may be amplified by a charge pump 401 and low-pass filtered by a loop filter 403 before it is used to adjust the VCO's 404 output signal frequency. Since the VCO 404 output is one of the inputs to the phase detector 401, this provides a feedback loop.

In some aspects of the invention, phase locked loops are analyzed as control systems by applying the Laplace transform. In a closed-loop control system, a sensor monitors the system output and feeds the data to a controller that adjusts the control as necessary to maintain a predetermined system output.

Loop characteristics can translate into transient characteristics of the output signal. These signal transients result from loop dynamics, such as how the loop responds to startup, changes in the reference signal, and changes to the feedback divider. The loop's natural frequency is a measure of the response time of the loop, and the damping factor is a measure of the overshoot and ringing. The loop characteristics can be controlled by employing different loop filters, such as a one-pole RC circuit or a lag-lead filter. However, higher-order filters are typically employed. Changing the types of filters, and changing filter impedance values effectively changes the loop transfer function.

A transfer function, as used herein, is a mathematical representation in terms of spatial or temporal frequency of the relation between the input and output of a linear time-invariant system with zero initial conditions and zero-point equilibrium.

Thus, some aspects of the invention employ variable filters. For example, a filter controller 413 may be employed to change how quickly the PLL attains lock (i.e., its settling time), change its damping behavior, attenuate FM sidebands, and/or change other functionality that affects the signal transients. The filter 403 may be a variable filter that comprises a plurality of selectable filter types, variable impedance elements, and/or selectable switches for switching between different filter element configurations. In this case, the filter controller 413 controls the filter 403. In some aspects, the filter 403 may comprise a combination of proportional, integral, and derivative filter functionality. Accordingly, variations of the filter 403 may comprise evaluating the loop's gain margin and/or phase margin. Various techniques used in control theory, such as PID control, may be used to select or adapt the filter 403, and, thus, may be incorporated into filter controller's 413 functionality.

In some aspects of the invention, the loop characteristics may be modified by adjusting the phase detector 401 gain and/or the VCO 404 gain. Accordingly, the PLL may comprise a phase detector gain controller 411 and/or a VCO gain controller 414.

The PLL, when employed as a frequency synthesizer, may include a frequency divider 405 in the feedback loop between the VCO 404 and the phase detector 401. The divider 405, which may be a programmable divider, divides the frequency of the VCO 404 output signal Sout that is fed back to the phase detector 401. Thus, when the circuit is in lock, the VCO's output frequency equals the reference signal's frequency times the divider's 405 division ratio. In some aspects of the invention, the fingerprint controller may control the programmable divider 405 to impart predetermined transient characteristics in the VCO's 404 output signal Sout.

In a harmonic oscillator (such as a crystal oscillator or an LC-tank oscillator), part of the resonant circuit's capacitance may be provided by a varactor diode, and the voltage applied to the diode varies the frequency. A reverse-biased semiconductor diode has a voltage-dependent capacitance. Thus, a control voltage applied to the diode can vary the oscillator's output. Other techniques, such as altering the charging rate of the capacitor by employing a voltage-controlled current source may be used. Thus, aspects of the invention may provide for synthesizing transient signatures to be added to the control voltage produced by the VCO control 414. The functional relationship between the control voltage and the output frequency is often non-linear, and such non-linearities can produce signal characteristics in the transmitted signal that facilitate identification of the transmitter. Thus, the VCO control 414 may compensate for such non-linear behavior or synthesize other variations to the functional relationship, such as to manufacture another identity In a ring oscillator, the frequency may be controlled by varying the supply voltage, the current available at each inverter stage, or the capacitive loading on each stage. In some aspects of the invention, the VCO control 414 may generate transient signatures for modulating voltage or current, or for changing the capacitive loading.

A VCO has a characteristic phase transient due to the transistor's flicker noise, as well as other causes. The effects of flicker noise are typically reduced by using negative feedback that linearizes the transfer function. Noise in the control signal causes phase noise in the VCO output, and tuning gain can also affect phase noise. Thus, aspects of the invention may provide a transient-signature signal to the control signal, a tuning signal that controls the tuning gain, or a feedback-control signal that controls the negative feedback. The transient-signature signal produces specific transient signal characteristics in the transmitted signal, such as predetermined transient signatures or a continuously changing transient signature.

In some aspects of the invention, the VCO may comprise a plurality of transistors, each being selectable by a switch controlled by the VCO control 414. Since each transistor has a unique electrical quality, which may be due to tolerances in the manufacturing process, switching between transistors can change the radio fingerprint of the transmitted signal.

Figure 5:
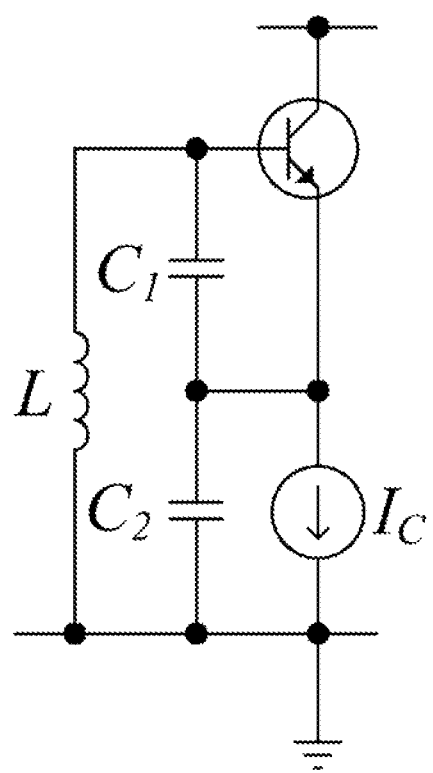
FIG. 5 is a circuit diagram of an oscillator that can be used as a VCO in some aspects of the invention.

FIG. 5 is a circuit diagram of an oscillator that can be used as a VCO in some aspects of the invention. The oscillator comprises a transistor and a positive feedback network that uses inductance and capacitance as an LC oscillator. The inductor may comprise a variable inductor for variable-frequency performance. Alternatively, a variable capacitor (not shown) connected in parallel with the inductor may be employed, or one of the capacitors $C_1$ or $C_2$ may be variable. In some aspects, a variable capacitor (not shown) may be placed in series with the inductor.

The theoretical oscillation frequency of the circuit shown in FIG. 5 is:

$$f_0 = \frac{1}{2\pi\sqrt{L\left(\frac{C_1 C_2}{C_1 + C_2}\right)}}$$

However, the circuit will oscillate at a slightly lower frequency due to junction capacitances of the transistor and other stray capacitances, which can introduce other characteristics in the transmitted signal that could be used to identify the transmitter. For this reason, aspects of the invention comprise variable circuit configurations that provide different stray capacitances and/or inductances as a countermeasure to radio fingerprinting.

Figure 6:
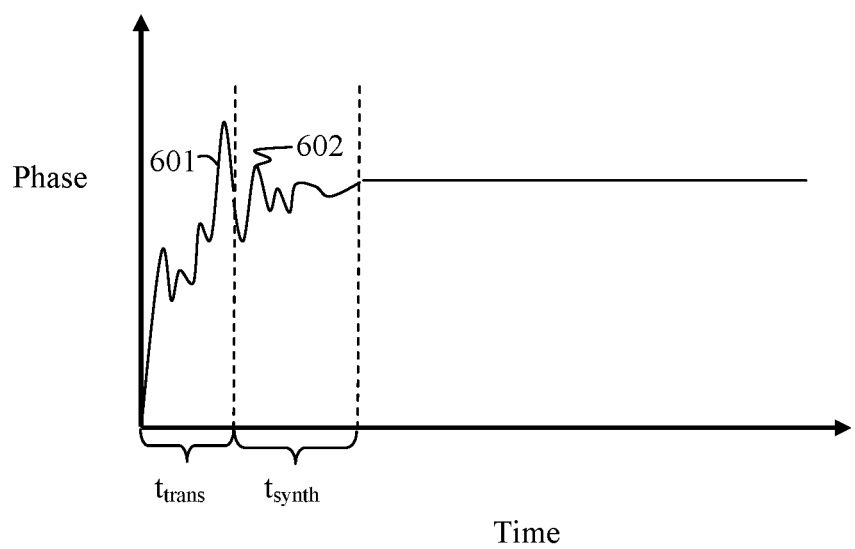
FIG. 6 is a time-domain plot of a transmitted signal's phase comprising a transient signal portion that may be adapted in accordance with aspects of the invention.

FIG. 6 is a plot of a transmitted signal's phase over time. Upon startup, the transmitted signal phase varies during a transient interval $t_{trans}$, such as depicted by a transient signal portion 601. Following the transient interval $t_{trans}$, the phase of the transmitted symbol is typically constant. However, in accordance with an aspect of the invention, a synthesized variable-phase signal 602 is appended to the transient interval $t_{trans}$, which extends the period during which the signal phase varies by a variable synthesized transient interval $t_{synth}$. Specifically, the duration of the synthesized transient interval $t_{synth}$ is variable such that the total interval of the transient $t_{trans}$ $t_{synth}$ measured by a receiver is variable. Therefore, the specific features that define a transceiver-print include the synthesized variable-phase signal 602 appended by the transmitter. This gives the transmitter the ability to control its radio fingerprint as measured by a receiver. For example, the transmitter may synthesize multiple radio identities, or it may continuously and randomly change synthesized transient interval $t_{synth}$ and/or other signal characteristics of the synthesized signal 602 to impede radio signature identification.

Figure 7:
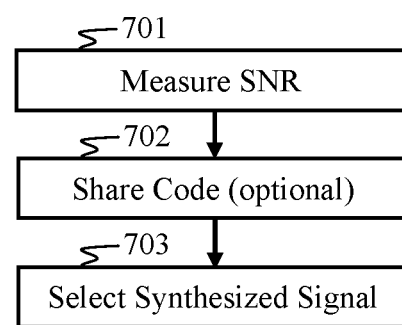
FIG. 7 is a flow diagram of a method according to an aspect of the invention.

FIG. 7 is a flow diagram of a method according to an aspect of the invention. A transmitter determines the link quality of its channel with an intended receiver. For example, the transmitter may measure 701 the SNR of the link. Since the synthesized signal 602 adds noise to the signal received at the receiver, the link quality can be used to select 703 the synthesized signal 602 to allow for an acceptable amount of signal degradation. Based on the measured SNR, the transmitter selects 703 the synthesized signal 602. For example, the transmitter may add a predetermined amount of phase jitter over a predetermined interval in the transmitted symbol's duration. The strength of the synthesized signal, its duration, the degree of phase offset, and/or other signal parameters may be selected 703.

In accordance with one aspect of the invention, the transmitter selects 703 the synthesized signal based on a code shared 702 with an intended receiver. For example, the transmitter may change the synthesized signal 602 at predetermined intervals and by predetermined amounts in accordance with the code. This permits the intended receiver to authenticate the transmitter while impeding unintended receivers from identifying and tracking the transmitter.

Figure 8:
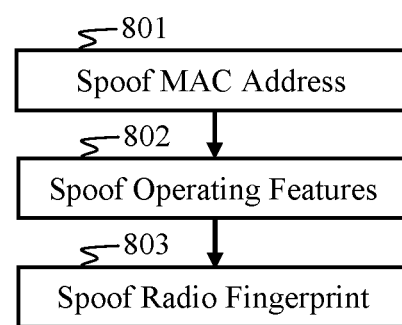
FIG. 8 is a diagram illustrating a method for spoofing a radio transmission in accordance with aspects of the invention.

FIG. 8 is a diagram illustrating a method for spoofing a radio transmission. A MAC address of a wireless client device (or some other subscriber terminal identification code) is spoofed 801, operating features of the radio (e.g., the protocol behavior above the Physical Level of the OSI model) are spoofed 802, and the RF characteristics (e.g., signal transient and/or spectral features that define the RF fingerprint) are synthesized or otherwise adjusted to a predetermined pattern 803, which may be set with respect to the selected MAC address and corresponding protocol behavior. The order in which the steps 801-803 may differ, and/or two or more of the steps 801-803 may be performed simultaneously.

Information in the MAC address, such as the OUI and serial number, can be used to identify the vendor and model of the client device. Thus, spoofing the MAC address 801 may comprise transmitting a spoofed MAC address that indicates a client device having a different model number. Alternatively, the spoofed MAC may indicate a client device made by a different vendor.

Spoofing the radio's operating features 802 comprises employing device-specific behavior in the transmissions corresponding to a different device. This device-specific behavior is also referred to as protocol behavior. Most wireless communication standards provide for different modes of operation and include provisions within frame formats for optional control bits or other optional data. For example, management frames that are used for device discovery, access point selection, authentication, and association typically include unreserved bits. These unreserved bits may be used for optional operating modes specified in the standard or in proprietary applications. Thus, different devices may operate in different modes while still complying with the same wireless transmission standard. Aspects of the invention may comprise operating a device in a selected mode that mimics device-specific behavior of a different device.

In one aspect of the invention, spoofing the radio's operating features 802 comprises including vendor-specific data in the transmission. Certain types of meta-data may be vendor-specific and/or device-model specific. For example, Apple and Linux devices typically include specific mDNS information in 802.11 packets. This mDNS information may be captured by an access point or a third party and compared to the transmitting device's MAC address to determine if the MAC address was spoofed. Furthermore, an Apple device may exhibit other characteristic behaviors that differentiate it from non-Apple devices, such as including the last access point's MAC and IP addresses in a client probe. Thus, a device spoofing the MAC address of an Apple device should emulate an Apple device's behavior.

Microsoft file and printer sharing over Ethernet may be indicated by frame format and other transmitted information. For example, NetBEUI (NetBIOS Extended User Interface) provides a standard frame format for transmission, which may be identified in a received wireless transmission. Thus, a device spoofing the MAC address of a device that supports a Microsoft operating system may emulate a Microsoft device's behavior.

In some aspects, transmitted meta-data may indicate which operating system resides on the transmitter, including the version and any updates. Thus, spoofing a radio's operating features 802 may comprise including meta-data in the transmissions that indicates a particular operating system that is consistent with the device type indicated by the spoofed MAC address.

In some aspects, the meta-data and/or the radio's behavior regarding how it transmits its signals may depend on the radio driver. For example, client devices employ active scanning whereby they switch to a channel, transmit a probe request, and wait for probe responses. These probe requests, as well as responses from access points, can be tracked. By observing the pattern of probe requests, one can learn about the client's scanning algorithm and verify if the client's behavior corresponds to the device type indicated by its MAC address. Thus, spoofing a radio's operating features 802 may comprise employing active scanning behavior that is consistent with the scanning behavior expected from the spoofed device type.

The hidden-node problem occurs when two or more wireless nodes that are unable to sense each other transmit to an access point, causing interference at the access point. If the nodes employ directional antennas, the hidden-node problem is worse. Solutions to the hidden-node problem are typically implemented at the medium access control (MAC) level. For example, a Carrier Sense Multiple Access with Collision Avoidance or an ALOHA protocol may be adapted to include handshaking. However, handshaking solutions apply to nodes that belong to the same network.

Alternatively, in cognitive radio, a first network may use the same frequency band as a second network without communicating with the second network. Specifically, MAC-layer messages are not shared between the networks, so the goal is to minimize interference with the second network by improving detection of potentially hidden nodes.

The basic idea behind cognitive radio is opportunistic spectrum sharing by identifying under-utilized licensed bands and utilizing those bands until they are used by their licensed users. One solution may include organizing multiple users at distributed locations into cooperative groups, each group functioning as an antenna array to improve sensing reliability.

In some aspects of the invention, a distributed cognitive radio system coordinates itself via local interactions between radios rather than via a centralized processing scheme. For example, there are two stages in consensus-based cooperative spectrum sensing. In the first stage, secondary users make measurements about primary users. In the second stage, a network is established among secondary users to locally exchange information in order to make a consensus determining the presence of primary users.

The hidden-node problem is typically addressed in the context of one node unintentionally interfering with communications between other nodes. There is a notable deficiency of effective solutions for situations in which the hidden node has malicious or selfish intent. For example, a common solution for a denial of service attack in which a hidden node sends a false request is MAC-based and simply provides additional validation embedded in the data transmissions.

A conventional Intrusion Detection System (IDS) monitors a network for malicious activities and/or policy violations. Intrusion detection typically employs a statistical anomaly analysis or a signature analysis. Statistical anomaly analysis creates a baseline performance metric for network traffic and then monitors the traffic for any activity outside the baseline parameters. However, this approach is only effective for identifying activities that significantly impact overall network traffic. Also, bad packets generated in the course of normal network activity can generate false alarms.

Signature analysis identifies network traffic for predetermined (i.e., known) attack patterns, known as signatures. Many attacks have distinct signatures. However, in order for signature analysis to be effective, it is necessary to maintain an up-to-date database of attack patterns.

There are two main types of IDSs. The first type is an independent system that connects to the network via a hub, switch, or network tap and monitors packets for malicious content. The second type resides on the host and monitors system calls, logs, and file systems for suspicious activities.

In a cooperative network, a new type of IDS is required. Since clients in cooperative networks employ many of the network control functions, aspects of the invention provide an IDS employed as a distributed system residing on the clients. Each client comprises an agent configured to communicate and cooperate with agents residing on other clients. Such a system can facilitate the identification of hidden nodes, better protect network resources from attacks and unauthorized access, and implement effective countermeasures.

An important motivational background for aspects of the invention is related to the study of the human body's immunological response as a distributed response mechanism.

In aspects of the invention, a cooperative network may function like a Wiki. While a Wiki allows anyone who accesses it to contribute or modify content, Wiki-like cooperation among network nodes (i.e., a Network Wiki) allows those nodes to administer network services to other nodes in the network and maintain a database of information about each node. The knowledge system of the Network Wiki comprises information about each node, including its Health, Trustworthiness, Capabilities, and the Reliability of its connection to the network. This information can be updated by the node itself (to a limited degree) and other nodes (to a greater degree). These updates are weighted based on each contributing node's Trustworthiness.

In accordance with aspects of the invention, a Cooperative Intrusion Detection system combines the concept of Wiki with the self-healing/self-configuring capabilities of an ad-hoc network. However, instead of relying on the soft-security of Wiki, which makes damage easy to repair rather than attempting to prevent damage, aspects of the invention employs the distributed characteristics of the human body's immunological response. This strategy allows the community of users to identify malicious intent and perform counter-measures before network services are disrupted.

Specifically, the system authenticates users and identifies threats based on a biological architecture. Users authenticate each other and construct a measure of trustworthiness based on both authentication and behavior. This process mirrors how a biological system regulates healing and immune responses. In fact, the biological immune response is the model for the security functions in some aspects of the invention. For example, individual nodes perform the function of T-cells and B-cells. Macroscopic network-management messages pertaining to the over-all health of the community take the form of Interleuken-4 and Interleuken-8, which are used by the immune-response system to regulate inflammation. In the network, these messages alert nodes to an attempted attack. Microscopic network-management messages for identifying and neutralizing threats take the form of neutrifils (which direct T-cells to migrate to injuries in the body) and IgE (which tags foreign bodies for destruction).

Extending this network management scheme even further, the community of nodes may employ Genetic Algorithms to distribute services and mitigate threats, since this function reduces to an optimization problem for assigning network-administration functions of varying importance to nodes having varying degrees of Trustworthiness and Availability.

Antibodies are gamma globulin proteins produced by B-cells. They identify and neutralize foreign objects, particularly viruses and bacteria. A small region at the tip of the protein is extremely variable, allowing for a large number of antibodies. Each variant binds to a different antigen. The unique part of the antigen recognized by an antibody is called an epitope. This is similar to network attack signatures in an attack-signature database. A typical human B cell will have 50,000 to 100,000 antibodies bound to its surface. An attack-signature database may comprise millions of signatures. Antibodies bind to their associated epitopes, which tags it for attack by other parts of the immune system. A particular network node may be targeted for attack—e.g., blocked from the network or disabled.

Antibodies occur in two forms:
1. Free antibodies are a soluble form secreted into the blood and other fluids in the body. Free antibodies are implemented as a software agent that is distributed throughout the network. A network node may be required to accept an antibody program before it is allowed to join the network. The antibody program may eradicate viruses and/or other malware residing on the node. It may also monitor node behavior and then inform the rest of the network of any problems (e.g., it may signal the network to neutralize the node). The antibody program may shut down the node or otherwise disrupt the node's access to the network if problems are detected, or in response to a kill command from a trusted node.
2. A surface immunoglobulin is a membrane-bound form that is attached to the surface of a B-cell. It allows the B-cell to detect when a specific antigen is present in the body and triggers B-cell activation. The corollary of a surface immunoglobulin is a software agent residing on a trusted network node that monitors other nodes and alerts the network to any suspicious activity.

Figure 9:
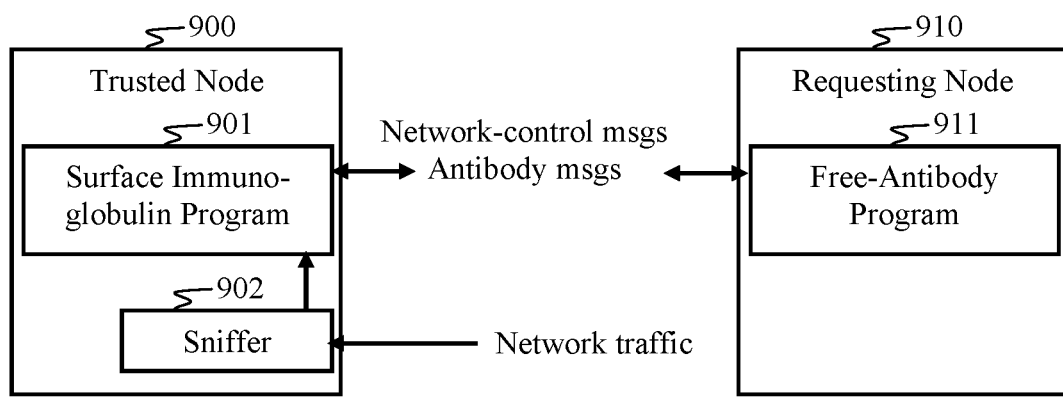
FIG. 9 is a block diagram illustrating message passing between software agents residing on a trusted node and a requesting node in accordance with some aspects of the invention.

FIG. 9 is a block diagram illustrating message passing between software agents residing on a trusted node 900 and a requesting node 910. A surface immunoglobulin program 901 resides on the trusted node 900, and upon being accepted by the requesting node 910, a free-antibody program 911 resides on the requesting node 910.

In one aspect of the invention, the surface immunoglobulin program 901 communicates with at least one free-antibody program 911 residing on at least one requesting node 910 via antibody messages. Furthermore, the surface immunoglobulin program 901 may communicate with other surface immunoglobulin programs (not shown) residing on other trusted nodes (not shown) via network-control messages. The surface immunoglobulin program 901 may monitor network traffic, such as via a sniffer 902 that detects communications between other nodes.

Antibodies can come in different varieties, known as isotypes, or classes. Antibody programs may come in a variety of classes. For example, some programs may scan for and eradicate viruses, some may scan for and eradicate other types of malware, and some may identify and respond to intruder nodes or types of network attacks.

The antibody isotype of a B-cell changes during cell development and activation. Immature B-cells, which have never been exposed to an antigen, are known as naïve B-cells and express only the IgM isotype in a cell surface bound form. Its corollary is a network node with low Trustworthiness. This "naïve" node's function is limited to monitoring other nodes.

B-cells begin to express both IgM and IgD when they reach maturity. The co-expression of both these immunoglobulin isotypes renders the B-cell "mature" and ready to respond to antigens. A network node with high Trustworthiness is defined as "mature" and it has additional functions, such as performing countermeasures to identified threats, as well as updating attack signatures and anti-virus and anti-malware software. Maturity may be assigned to a node via a combination of consensus authentication and monitoring of the node's behavior.

B-cell activation follows engagement of the cell-bound antibody molecule with an antigen, causing the cell to divide and differentiate into an antibody-producing cell called a plasma cell. In this activated form, the B-cell produces antibodies in a secreted form rather than a membrane-bound form. A corollary to this behavior is when a node discovers a new type f attack and sends updates to the attack signatures used by other nodes. Once a node identifies a particular threat, it may instruct other nodes to scan for that threat.

Antibodies contribute to immunity in three ways:
1. Isolation: They prevent pathogens from entering or damaging cells by binding to them. In aspects of the invention, nodes deny network access to an infected or unidentified node. The network may reconfigure itself to route information around or away from the infected or unidentified node.
2. Tagging: They stimulate removal of pathogens by macrophages and other cells by coating the pathogen. In the proposed network, a node identifies and targets an infected or malicious node as a threat, and the antibody software records the signature of any new virus, identifiers for other types of malware, and/or attack signature. The node's MAC address (which comprises the device's unique serial number) may be blacklisted to inform other nodes about the infected or malicious node.
3. Countermeasure: They trigger destruction of pathogens by stimulating other immune responses, such as the complement pathway. In the proposed network, the nodes may eradicate viruses and/or other malware in an infected node. The nodes may trigger a network-administration function that deactivates an infected or malicious node. The nodes may coordinate a DoS attack or other countermeasure to disrupt a malicious node.

Figure 10:
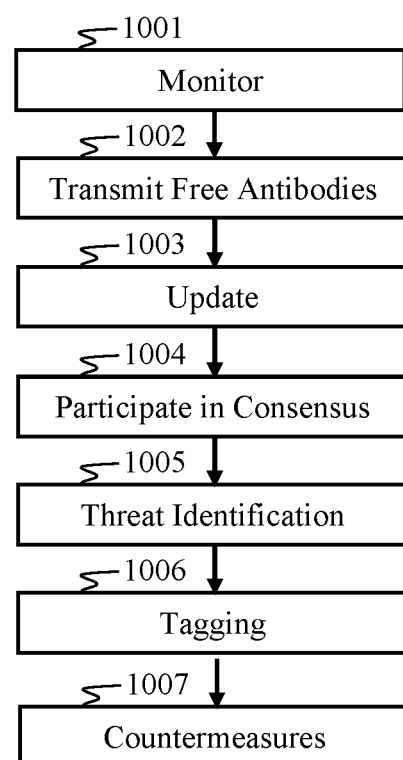
FIG. 10 depicts a machine-implemented method in accordance with aspects of the invention.

FIG. 10 depicts a sequence of steps 1001-1007 that may be performed by the surface immunoglobulin program 901. In one aspect of the invention, the sequence of steps 1001-1007 depicts functionality performed by nodes having progressively increasing levels of Trustworthiness.

A naïve node's function may be limited to monitoring 1001 other nodes and sending alerts when anomalous or prohibited behavior is detected. A more mature node may have limited participation in authenticating requesting nodes. For example, a node that has more trustworthiness than the naïve node may transmit 1002 a free-antibody program to a requesting node. A node with even higher trustworthiness may be permitted to update 1003 defensive programs and signature databases.

A next level of Trustworthiness may entail participating 1004 in consensus threat analysis with other nodes. Mature nodes may also identify threats 1005 and tag 1006 suspicious nodes. The most mature nodes (i.e., those with the highest level of Trustworthiness) may perform countermeasures 1007 against identified threats.

Network analysis tools may be configured to monitor and record the types and frequency of attack signature updates in the network. In this way, network function may be analyzed and evaluated using a similar means employed in biochemical assays for disease diagnosis.

In some aspects of the invention, Cooperative Intrusion Detection employs software agents that reside on individual nodes. These software agents utilize data obtained from collaborative sensing, and they collaboratively process the data to characterize the behavior of nodes requesting access to the network. The software agent may be designed in accordance with the following parameters:
  Persistence: The agent runs continuously on the client, and it decides when it should perform some activity.
  Autonomy: The agent is configured to perform predetermined tasks, prioritize those tasks, and perform some predetermined level of decision making.
  Social Ability: Agents interact with each other for sharing data and performing collaborative data processing and decision making. The agents may employ any of various formats for communicating and coordinating activities between the agents.

Reactivity: Agents perceive the context in which they are operating, and they are configured to react to events in predetermined ways based on the context.

Software agents identify and authenticate nodes requesting access to the network. In some aspects, the agents are programmed to respond to a variety of different attacks.

The methods and systems described herein merely illustrate particular aspects of the invention. It should be appreciated that those skilled in the art will be able to devise various arrangements, which, although not explicitly described or shown herein, embody the principles of the invention and are included within its scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A radio transmitter, comprising:
a frequency-upconverter configured to upconvert a baseband or intermediate-frequency signal to a radio frequency (RF) signal;
an amplifier configured to amplify the RF signal to produce a transmission signal; and
an RF fingerprint control circuit configured to cause a change in non-linear behavior of at least one of the frequency-upconverter and the amplifier to change the radio transmitter's RF fingerprint.

2. The radio transmitter of claim 1, wherein the fingerprint control circuit determines or selects a threshold of signal distortion that impedes identification of the radio transmitter based on the radio transmitter's RF fingerprint while providing an acceptable amount of degradation to the radio transmitter's data transmissions, and distorts the RF fingerprint by an amount that is below the threshold.

3. The radio transmitter of claim 1, wherein the frequency-upconverter or the amplifier comprises a phase-locked loop (PLL), and the RF fingerprint control circuit changes at least one PLL loop characteristic to change transient characteristics of the PLL's output signal.

4. The radio transmitter of claim 3, further comprising a variable filter inside the PLL, wherein the variable filter comprises a plurality of selectable filter types, at least one variable impedance element, or switches for switching between different filter element configurations; and wherein the RF fingerprint control circuit changes loop filter impedance or loop filter type to change the PLL's loop transfer function.

5. The radio transmitter of claim 3, wherein the RF fingerprint control circuit is configured to measure the PLL's gain margin or phase margin.

6. The radio transmitter of claim 3, wherein the RF fingerprint control circuit is configured to control at least one of a phase detector, a voltage controlled oscillator, or a programmable divider in the PLL.

7. The radio transmitter of claim 3, wherein the RF fingerprint control circuit provides a signature signal to a voltage-controlled oscillator's control signal, a tuning signal that controls tuning gain, or a feedback-control signal that controls negative feedback.

8. The radio transmitter of claim 1, wherein the frequency-upconverter or the amplifier comprises at least one diode, and the RF fingerprint control circuit selects a control voltage applied to the diode or adapts the diode's current source.

9. The radio transmitter of claim 1, wherein the frequency-upconverter comprises a ring oscillator, and the RF fingerprint control circuit varies at least one of supply voltage, current, or capacitive loading in the ring oscillator.

10. The radio transmitter of claim 9, wherein the RF fingerprint control circuit modulates the supply voltage or the current with a fingerprint signal.

11. The radio transmitter of claim 1, wherein the frequency-upconverter comprises a voltage-controlled oscillator comprises a plurality of transistors, and the RF fingerprint control circuit is configured to switch between the plurality of transistors to change the RF fingerprint.

12. The radio transmitter of claim 1, wherein the RF fingerprint control circuit changes the RF fingerprint in a manner corresponding to a code shared with an intended receiver.

13. The radio transmitter of claim 12, wherein the intended receiver is configured for analyzing the pattern to authenticate the radio transmitter.

14. The radio transmitter of claim 1, wherein the RF fingerprint control circuit changes the RF fingerprint by switching between a plurality of different RF fingerprints or continuously randomizing the RF fingerprint.

15. The radio transmitter of claim 1, wherein the RF fingerprint control circuit pairs each of a plurality of RF fingerprints with one of a set of selectable subscriber terminal identification codes.

16. The radio transmitter of claim 15, wherein each of the set of selectable subscriber terminal identification codes comprises a MAC address that indicates at least one of a client device having a different model number than the radio transmitter and a client device having a different vendor number than the radio transmitter.

17. The radio transmitter of claim 1, wherein the RF fingerprint is at least one of a transient radio signature and a steady state radio signature.

* * * * *